United States Patent
Grausgruber et al.

(10) Patent No.: US 10,166,635 B2
(45) Date of Patent: Jan. 1, 2019

(54) WELDING DEVICE COMPRISING AN ACTIVE HEATING DEVICE FOR HEATING THE WORKPIECE

(71) Applicant: STIWA Holding GmbH, Attnang-Puchheim (AT)

(72) Inventors: Klaus Grausgruber, Breitenschuetzing (AT); Michael Thaler, Voecklabruck (AT); Michael Pauditz, Schwanenstadt (AT)

(73) Assignee: STIWA Holding GmbH, Attnang-Puchheim (AT)

( * ) Notice: Subject to any disclaimer, the term of this patent is extended or adjusted under 35 U.S.C. 154(b) by 361 days.

(21) Appl. No.: 15/022,237

(22) PCT Filed: Sep. 16, 2014

(86) PCT No.: PCT/AT2014/050206
§ 371 (c)(1),
(2) Date: Mar. 16, 2016

(87) PCT Pub. No.: WO2015/039154
PCT Pub. Date: Mar. 26, 2015

(65) Prior Publication Data
US 2016/0228993 A1   Aug. 11, 2016

(30) Foreign Application Priority Data

Sep. 17, 2013 (AT) ................ A 50593/2013
Sep. 5, 2014 (AT) ................ A 50611/2014

(51) Int. Cl.
*B23K 26/60* (2014.01)
*B23K 26/262* (2014.01)
(Continued)

(52) U.S. Cl.
CPC .............. *B23K 26/60* (2015.10); *B23K 26/21* (2015.10); *B23K 26/262* (2015.10);
(Continued)

(58) Field of Classification Search
CPC .... B23K 26/60; B23K 26/262; B23K 26/282; B23K 26/21
(Continued)

(56) References Cited

U.S. PATENT DOCUMENTS 4,827,099 A   5/1989   Krebs et al.
5,900,079 A   5/1999   Ono et al.
(Continued)

FOREIGN PATENT DOCUMENTS

CN   101848785 A   9/2010
CN   202278325 U   6/2012
(Continued)

OTHER PUBLICATIONS

International Search Report of PCT/AT2014/050206, dated Mar. 10, 2015.
Chinese Search Report in CN 201480061224.1, dated Jan. 1, 2017.

*Primary Examiner* — Samuel M Heinrich
(74) *Attorney, Agent, or Firm* — Collard & Roe, P.C.

(57) ABSTRACT

The invention relates to a welding device (1), in particular a laser welding device, for welding metal workpieces (3) by means of at least one welding head (2), in particular a laser welding head, which defines a working area (4). The welding device is characterized by at least one heating device (5) which acts on the working area (4) to heat up the workpiece (3), in particular before and/or after the welding process.

34 Claims, 8 Drawing Sheets

(51) Int. Cl.
- *B23K 26/282* (2014.01)
- *B23K 26/21* (2014.01)
- *C21D 9/50* (2006.01)
- *B23K 101/06* (2006.01)
- *C21D 1/38* (2006.01)
- *C21D 1/42* (2006.01)

(52) U.S. Cl.
CPC .............. *B23K 26/282* (2015.10); *C21D 9/50* (2013.01); *B23K 2201/06* (2013.01); *C21D 1/38* (2013.01); *C21D 1/42* (2013.01); *Y02P 10/253* (2015.11)

(58) Field of Classification Search
USPC ........................................ 219/121.63, 121.64
See application file for complete search history.

(56) References Cited

U.S. PATENT DOCUMENTS

| | | | |
|---|---|---|---|
| 6,184,493 B1 | 2/2001 | Tsuchiya | |
| 6,365,866 B1 | 4/2002 | Brenner et al. | |
| 6,843,866 B2* | 1/2005 | Brenner | B23K 10/027 148/525 |
| 2004/0185946 A1 | 9/2004 | Gustafsson et al. | |
| 2010/0072193 A1* | 3/2010 | Kuemmel | B23K 26/24 219/661 |
| 2010/0258535 A1 | 10/2010 | Fukutani et al. | |
| 2011/0253677 A1 | 10/2011 | Graham et al. | |

FOREIGN PATENT DOCUMENTS

| | | |
|---|---|---|
| CN | 202356772 U | 8/2012 |
| CN | 203015161 U | 6/2013 |
| DE | 40 17 634 A1 | 12/1991 |
| DE | 196 37 465 C1 | 12/1997 |
| DE | 10 2010 063 835 A1 | 6/2012 |
| EP | 0 038 655 A2 | 10/1981 |
| EP | 0 262 363 B1 | 9/1989 |
| EP | 0 739 678 B1 | 12/1999 |
| EP | 0 980 736 A2 | 2/2000 |
| GB | 794 001 A | 4/1958 |
| GB | 2 478 275 A | 9/2011 |

* cited by examiner

WELDING DEVICE COMPRISING AN ACTIVE HEATING DEVICE FOR HEATING THE WORKPIECE

CROSS REFERENCE TO RELATED APPLICATIONS

This application is the National Stage of PCT/AT2014/050206 filed on Sep. 16, 2014, which claims priority under 35 U.S.C. § 119 of Austrain Application No. A 50593/2013 filed on Sep. 17, 2013 and Austrain Application No. A 50611/2014 filed on Sep. 5, 2014, the disclosures of which are incorporated by reference. The international application under PCT article 21(2) was not published in English.

The invention relates to a welding device, in particular a laser welding device, for welding workpieces, comprising at least one welding head, in particular a laser welding head, which is directed onto a working area when in a working position. The invention further relates to a welding method.

EP0739678B1 discloses a method of producing welded steel pipe. An inductor is used for this purpose, which is open at one end and can thus be positioned over a pipe to be welded. The inductor is used to pre-heat the pipe. The disadvantage of such an inductor is that it is not possible to pre-heat the entire circumference of the pipe uniformly, which induces undesirable stress in the region of the welding point.

In connection with beam welding, DE19637465C1 discloses a double-winding half-shell inductor for pre-heating the workpiece. The drawback of uneven pre-heating is even worse in this instance than with the welding device disclosed by the previous publication.

DE4017634A1 and EP0262363B1 also disclose inductive pre-heating of a workpiece to be welded. The disadvantage in this instance is that the workpiece has to be threaded through the inductor and can therefore be conveyed and introduced into the welding device along its longitudinal extension only.

The objective of the invention is to eliminate the disadvantages of the prior art and propose a welding device by means of which the workpiece can be uniformly heated, including in the immediate region around the (future) weld seam. In other embodiments, the intention is to make it much easier to introduce the workpiece or two workpiece parts to be joined to one another. The welding device should also be characterized by a space-saving design and should be easy to control.

This objective is achieved by means of a welding device of the type outlined above, due to the fact that the welding device comprises at least one heating device acting on the working area in order to heat the workpiece, in particular before and/or after the welding operation. This increases welding quality and in particular prevents tears in the material. The heating device is preferably provided in addition to the welding head and is therefore a separate heat or energy source.

The heating device may be provided as a pre-heating unit and/or a reheating unit. The heating device may be switched on during the actual welding operation itself in order to assist the introduction of heat by the welding head. One heating device may also be provided as a pre-heating unit (laser source) and another heating device is provided as a reheating unit (inductor).

By working area is meant the area which, when the welding head is in the working position and is in working positions during operation, is influenced by the latter directly (melting) and indirectly (introducing heat). In other words, it is an area around the (resultant) weld seam. The working area is not limited to the welding point as such but also comprises an area extending around the welding point. The welding head may be designed in such a way, for example, that it moves to the working position again with every welding cycle and stays in a standby position in between.

Based on a preferred embodiment, the heating device or at least a part of the heating device can be moved relative to the working area and the heating device or at least a part of the heating device is preferably connected to a drive and can be driven by it. This makes it easier to introduce and change workpieces, thereby enabling the cycle time to be improved. The heating device or a part of it can be moved away from the working area in order to temporarily free up space. As soon as the workpiece has been positioned, the heating device can be moved back into its working position where it can be used to heat the workpiece. The drive of the heating device or one of its parts can also be used to guarantee uniform heating of the work-piece, e.g. the heating device can be rotated around the working area during the heating operation.

The working area is preferably surrounded by a housing-type structure in the working position, which forms a chamber around the area of the weld seam being produced. The housing-type structure may have at least one opening for introducing inert gas and/or at least one opening for discharging inert gas and/or a working opening for introducing the energy from the welding head. This keeps the heat in the region of the welding point and ensures economical use of a purging medium.

The housing-type structure is preferably made from thermal insulating material or is surrounded by a thermal insulation layer.

Based on a preferred embodiment, the heating device comprises at least one electromagnetic inductor disposed in the working area for heating the workpiece by induction. This offers a particularly simple way of providing uniform heat. An electromagnetic inductor has proved to be particularly reliable in terms of activation and control.

In the case of another preferred embodiment, the inductor is made up of at least two inductor parts which can be moved relative to one another so as to enclose a workpiece to be welded when in a working position and to release the workpiece in an open position in which the inductor parts are spaced apart from one another.

The advantage of this embodiment in particular is that it offers a very simple way of introducing the workpiece or workpiece parts to be joined to one another (joint welding) into the welding device and positioning the workpiece in the working area of the welding head. When the inductor is in the open position, the inductor parts are spaced sufficiently apart from one another to enable the workpiece to be introduced from different directions, including in particular transversely to the longitudinal extension of the workpiece. It is no longer necessary to thread the (elongate) workpiece into the inductor.

The inductor parts are preferably segments of what is overall an annular shape which surrounds an elongate workpiece in the working position. Based on a preferred embodiment, two inductor parts are provided, which constitute half-segments of the inductor of essentially the same size. Naturally, it would also be conceivable to provide more than two inductor parts and the size of the inductor parts also does not necessarily have to be identical. The annular shape need not necessarily be circular but may also be provided with corners (e.g. may be quadrangular or also polygonal).

The welding device is preferably a laser welding device with a laser processing head because the photons emitted remain unaffected by the magnetic field of the inductor and inductive heating can therefore also be run without any problem during the actual welding operation (when the laser beam is directed onto the workpiece). In principle, however, welding devices operating on any other principle would also be conceivable: beam welding (laser, electron), arc welding, MAG Based on one preferred embodiment, the inductor parts can be moved relative to one another in the direction extending transversely to, preferably perpendicular to, the axis of the inductor. This represents a particularly advantageous solution in terms of saving space and handling of the workpiece.

Based on another preferred embodiment, at least one of the inductor parts is connected to a drive and can be driven by it relative to the other inductor part. Manual operation is therefore not necessary, which is a major advantage, especially given the high temperatures. It would naturally also be possible for both inductor parts to be driven by a common drive or separate drives. The important thing is that an open position is obtained in which a workpiece can be introduced into the working area.

Based on another embodiment, the heating device or at least a part of the heating device may be moved to a position parallel with the longitudinal axis of the workpiece.

Based on another preferred embodiment, the welding device comprises a control unit which is connected to the drive and automatically controls it. This enables the welding operation to be automated as far as possible. The entire process can be operated on an automated basis in conjunction with a conveyor device for bringing in and transporting the workpieces away and for positioning them in the working area, in particular a driven chain or belt.

Based on another preferred embodiment, the welding device comprises at least two housing parts which can be moved relative to one another in order to create a chamber around the working area when in a working position and one of the inductor parts is integrated in one of the housing parts and another inductor part is integrated in another housing part. The housing parts form a chamber that is closed to a greater or lesser degree and offers an economical way of feeding a purging medium into the working area. Furthermore, the housing parts prevent the heat from being lost to the outside. The (energy) efficiency of such a process can therefore be significantly increased.

Based on another preferred embodiment, the inductor parts each sit on the internal wall of the housing parts. This enables a particularly compact and space-saving solution to be obtained whereby the inductor parts can be disposed particularly close to the (future) weld seam.

Based on another preferred embodiment, at least one of the housing parts has an inlet for introducing a purging medium.

In another preferred embodiment, at least one of the housing parts has an outlet for discharging a purging medium.

Based on another preferred embodiment, at least one of the housing parts has a working opening via which the thermal energy from the welding head disposed outside the chamber can be directed onto the workpiece. The welding head in this instance is disposed outside the housing parts. The thermal energy introduced into the chamber and hence into the working area is therefore given off to the environment only very slowly.

The housing parts are preferably surrounded by insulation in the form of a thermal insulating material, thereby further enhancing the effect of concentrating heat in the working area.

Based on another preferred embodiment, a temperature sensor is disposed in the working area, which is preferably coupled with one of the inductor parts. Measuring the temperature in the direct working area enables key process parameters to be controlled, in particular the power, thereby guaranteeing a particularly high quality of the weld seam.

Based on another preferred embodiment, the windings of the inductor are disposed symmetrically by reference to the working area in terms of their number. This ensures uniform inductive pre-heating and/or reheating or uniform inductive heating during the actual welding operation. By symmetrical in this connection is meant that the same number of current-carrying windings is disposed on either side of the welding point.

Based on another preferred embodiment, the welding device comprises a control unit which is connected to the power supply of the inductor, the welding head and optionally the temperature sensor. This enables the welding device proposed by the invention to be controlled on a fully automated basis.

Based on another preferred embodiment, the heating device is a radiation source, in particular a laser source, and the radiation source is rotatable around the working area by means of a drive. This ability to rotate enables all areas of the welding point to be uniformly irradiated.

Based on another preferred embodiment, the heating device comprises beam deflecting means which direct the beams emitted by the welding head onto the working area. With this embodiment, the energy of the welding head can simultaneously be used for pre-heating and/or reheating.

Based on another preferred embodiment, the heating device comprises at least one electric heating element.

Another preferred embodiment is characterized by the fact that the at least one heating device is configured so that it acts on the workpiece on both sides of the welding point.

Based on another preferred embodiment, a first heating device acts on one side of the welding point and a second heating device acts on the other side of the welding point.

These two embodiments also ensure that the workpiece is uniformly heated.

Based on another preferred embodiment, the welding device comprises at least two adjacently disposed welding stations or welding lines which can be set up with workpieces or workpiece parts to be welded by means of at least one displaceable workpiece carrier, and the at least one heating device is configured so that workpieces or workpiece parts can be heated by the heating device in timed cycles, and each welding station or each welding line may comprise a separate heating device. This enables a parallel work operation, resulting in significantly shorter cycle times. For example, pre-heating may take place on a first welding line whilst another welding line can already be being set up with a workpiece. If welding is taking place on the first welding line, pre-heating can already be taking place on the second welding line. The workpiece carrier ensures that the welding lines are constantly in the process of being set up. There are no dead times.

It may also be of practical advantage if the welding device comprises a retaining device by means of which a filler metal can be introduced between a first joint surface of a first component and a second joint surface of a second component, and the filler metal is provided in the form of a shaped filler metal body having a first contact surface which can be placed in contact with the first joint surface of the first component and a second contact surface which can be placed in contact with the second joint surface of the second component. The advantage of this is that the filler metal body can be produced independently of the actual welding operation or welding process and can be introduced between the components to be joined during the welding process. Accordingly, the filler metal body can be produced by means of any production process, such as casting, powder injection followed by sintering, selective laser melting or by mechanical processing. Accordingly, the filler metal body may have an exact, predefined shape, as a result of which the normal distance between two components can be exactly predefined or a specific alloy distribution in the filler metal body can be predefined. Another advantage of the filler metal proposed by the invention is that it can be produced at a different production unit and therefore prefabricated and supplied independently of the welding process and also of the components to be welded.

The objective can also be achieved by means of a welding method, in particular a laser welding method, for welding metal workpieces in particular by means of a welding device as defined in the preceding claims, characterized by the steps: positioning a workpiece to be welded in the working area of the welding head; running the welding operation by activating the welding head; and heating the workpiece by means of the heating device before, during and/or after the welding operation.

The objective can also be achieved by a welding method, in particular a laser welding method, for welding metal, in particular elongate, workpieces by means of a welding device as defined in one of the preceding embodiments characterized by the steps: positioning a workpiece to be welded in the working area of the welding head whilst the inductor is in an open position in which the inductor parts are spaced apart from one another; moving the inductor parts relatively into the working position in order to enclose the workpiece to be welded; running the welding operation by activating the welding head; and heating the workpiece by energizing the inductor.

In addition to the advantages already described, it should be pointed out at this stage that additionally heating the workpiece by induction can have the following advantageous effects: it reduces the energy consumption of the welding head; uniform pre-heating and/or reheating prevents quench cracking; and slow and controlled cooling increases the strength of the weld seam.

Based on a preferred embodiment, the workpiece is heated by means of the heating device (e.g. by energizing the inductor) before the welding operation and the duration of the heating operation prior to the welding operation is preferably at least 0.5 s, preferably at least 1s. As a result of this feature, the workpiece or workpiece parts are brought to a predefined temperature level in the region of the (future) weld seam (e.g. between 300° C. and 400° C.). The power of the welding head, e.g. the laser welding head, may therefore be lower.

Based on another preferred embodiment, the workpiece is heated by means of the heating device (e.g. by energizing the inductor) during the welding operation. The heating device thus assists the build-up of heat in the workpiece without enabling a welding operation to be run on its own.

Based on another preferred embodiment, the workpiece is heated by means of the heating device (e.g. by energizing the inductor) after the welding operation and the duration of the heating operation after welding is preferably at least 5 s, preferably at least 10 s. Such reheating as proposed by the invention is of particular advantage because directly after the welding operation, the weld seam can be kept at a predefined temperature level (preferably between 300° C. and 400° C.) in order to prevent tearing in the material. Disposing the heating device (e.g. inductor) in the working area and directing it onto the working area in situ ensures that the temperature does not drop below a temperature that is not conducive to hardening the weld seam. A separate heat treatment outside the welding device is therefore no longer necessary.

Based on another preferred embodiment, before, during and/or after the welding operation, a measurement is taken of the temperature by means of a temperature sensor disposed in the working area and heating of the workpiece by energizing the inductor is controlled by a control unit depending on the temperature. This enables particularly accurate temperature control and results in high-quality weld seams.

Another preferred embodiment is one based on laser welding with an integrated induction heating process. A split inductor moves from above and underneath over the workpiece to be welded, e.g. a tube, and the conveyor device, e.g. chain, operates on the basis of a timed cycle. This significantly reduces unnecessary movements because the workpiece (tube) would otherwise have to be threaded in. The pre-heating time is ca. 1-2 s. This is followed by laser welding. The reheating time is at least ca. 10 s, depending on the material.

As a result of this feature, there is absolutely no interruption between the laser welding operation and reheating. Quench cracking is avoided, resulting in a reliable process. The inductor parts are then moved apart from one another and the conveyor chain moves on.

Accordingly, pre-heating, welding and reheating can all take place in a single module. It is preferable if only a small inductor is needed (heating only where necessary), thereby saving on energy.

As already mentioned, the inductor may be integrated in a shell or housing into which purging gas is fed, forming a sort of chamber around the welding area. A suction passage for the purging gas may be provided at the opposite end. A temperature measuring means may be provided, in particular within the chamber.

The method proposed by the invention may be used to produce both round and longitudinal seams.

The welding method may comprise the following method steps:
  providing the first component;
  providing a filler metal in the form of a shaped filler metal body having a first and a second contact surface;
  positioning the filler metal body so that the first contact surface of the filler metal body is placed in contact with the first joint surface of the first component;
  positioning the second component relative to the first component so that the second joint surface of the second component is in contact with the second contact surface of the filler metal body;
  running the welding operation with at least partial melting of the first component, filler metal body and second component by applying thermal energy and forming a weld seam.

The advantage of this thermal joining process is that it can be run using filler metal in the form of the filler metal body. The latter can be produced independently of the two components and then made available for the joining process. By contrast with coating, it is not necessary to treat the components to be joined prior to the joining operation. This enables the cycle time to be improved, especially on a mass production basis, because the filler metal body is produced elsewhere and can therefore be made available at any time. Another advantage of the method proposed by the invention resides in the fact that either no additional filler metal at all is needed during the welding process or at least some of this extra filler metal can be dispensed with because the filler metal is at least partially provided in the form of the filler metal body introduced between the joint surfaces of the two components to be joined. The actual welding operation can be implemented on standard equipment without the complication of feeding in additional materials. Another advantage of the method proposed by the invention is the fact that the metering of alloying elements in the weld seam can be set very accurately on the basis of the geometric dimensions of the filler metal body and its composition. Even if there are changes in speed during the welding process, metering remains constant whereas in the prior art, a wire or supply of powder has to be adapted to the welding speed. This can lead to problems in the region of accelerated production lines.

Furthermore, before and/or during the welding operation, a compression force may be applied to the two components from opposite directions, thereby pushing them together. The advantage of this is that the filler metal body can be clamped with a predefined force between the two components to be joined. Accordingly, the pressure acting on the joint surfaces can be pre-set and adapted to the requirements of the weld seam. If a filler metal body provided with a spring element is used, the spring element can be pre-tensioned by the compression force and this can be stored in the spring element after the welding operation, resulting in internal stress in the region of the welding point of the two components.

Based on another embodiment, the thermal energy may be applied by means of a welding head, in particular by laser welding, plasma welding, arc welding, gas welding, defocused electron beam welding, etc. The advantage of this is that applying thermal energy externally means that only an outer peripheral region of the filler metal body is melted. It also means that the thermal energy can be applied locally and specifically with a view to obtaining a desired shape of weld seam.

Based on another advantageous embodiment, the thermal energy applied can be measured in such a way that during the welding operation, only an outer peripheral region of the filler metal body and the part-regions of the two components respectively adjoining the outer peripheral region are melted. The advantage of this is that the inner region of the filler metal body is not melted and the normal distance or spacing between the two components can be maintained. The component can therefore be produced to the highest possible accuracy. Furthermore, if using a filler metal body with an elastic spring element in the inner portion, for example, this spring element is not melted and can thus preserve its shape, as a result of which the pre-tensioning during the welding operation will not be lost.

In particular, it may be of advantage if the two joint surfaces of the components have more or less the same cross-section as one another and are disposed next to one another forming a normal distance which is bridged by the filler metal body in the form of a butt joint. Especially in the case of a butt joint, the filler metal body proposed by the invention offers the advantages outlined above. This is ideal when producing hollow sections which have to be welded to one another for example, such as pipes, and also when welding corrugated components.

The welding head may rotate relative to the workpiece or the workpiece rotates relative to the welding head.

To provide a clearer understanding, the invention will be described in more detail with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

The embodiments illustrated as examples represent possible variants of the welding device and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description. All the figures relating to ranges of values in the description should be construed as meaning that they include any and all part-ranges, in which case, for example, the range of 1 to 10 should be understood as including all part-ranges starting from the lower limit of 1 to the upper limit of 10. i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in the drawing constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the welding device, it and its constituent parts are illustrated to a certain extent out of scale and/or on an enlarged scale and/or on a reduced scale.

Figure 1:
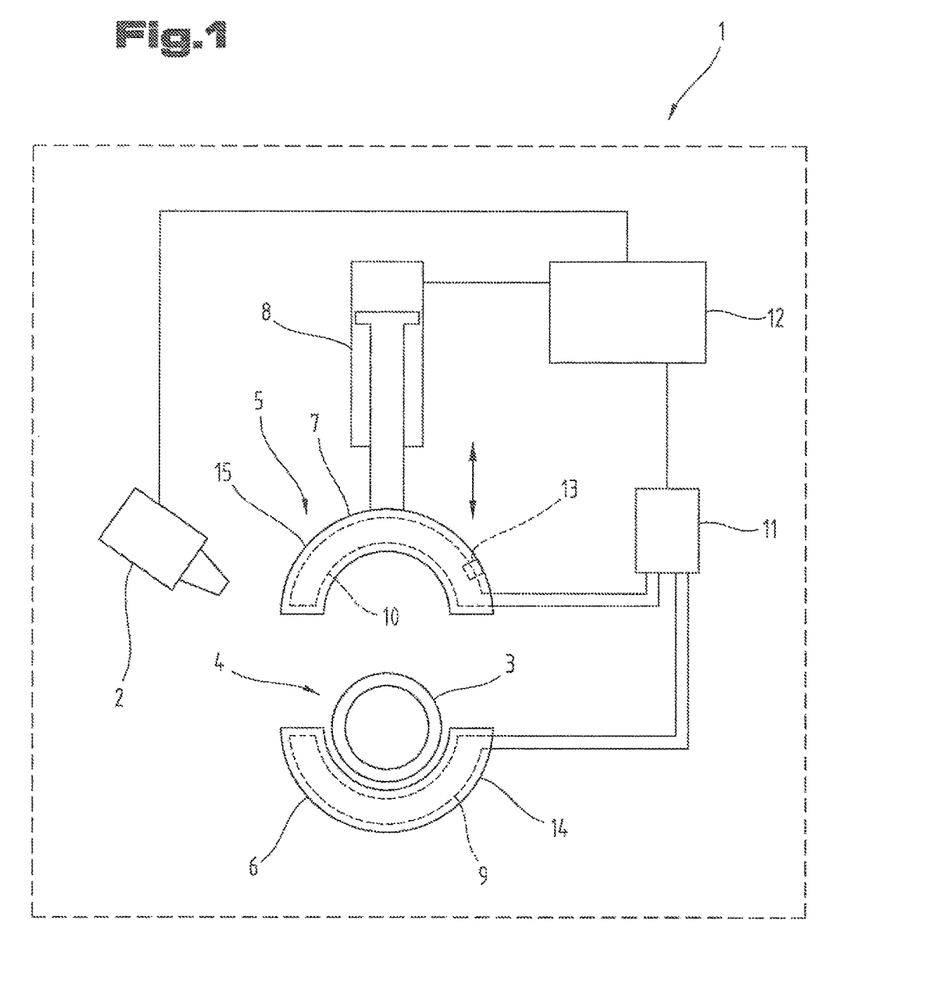
FIG. 1 an embodiment of a welding device.

FIG. 1 illustrates a welding device 1 in the form of a laser welding device for welding workpieces 3, comprising at least one laser welding head 2 which is directed onto a working area 4 when in the working position. The welding device comprises at least one heating device 5 acting on the working area 4 in order to heat the workpiece 3, in particular before and/or after the welding operation or also during the welding operation.

In the embodiment illustrated, the heating device 5 or at least a part 6, 7 of the heating device 5 can be moved relative to the working area 4. To this end, a part 6 of the heating device 5 is connected to a drive 8 by means of which it can be driven. The drive 8 may be a pneumatic, hydraulic, electric or magnetic drive, for example.

Figure 4:
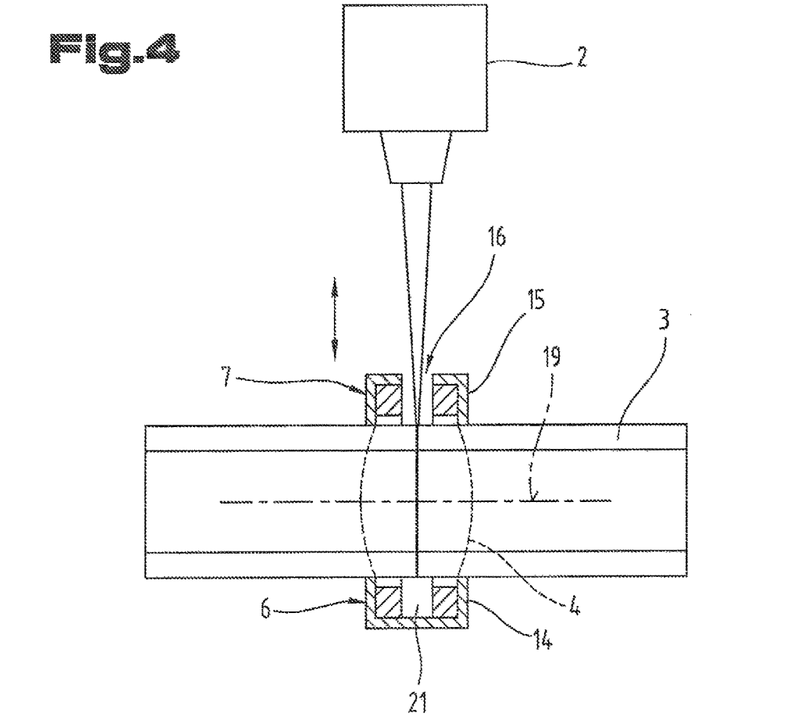
FIG. 4 a detail of a welding device proposed by the invention.
Figure 5:
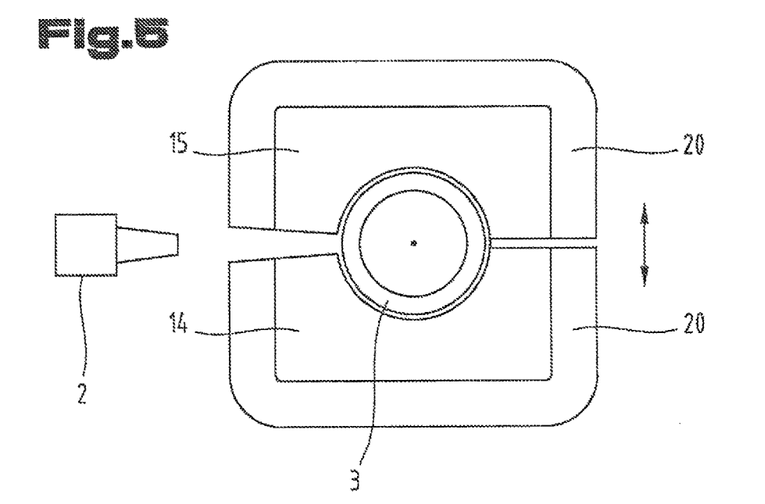
FIG. 5 an embodiment of the housing parts forming a chamber.

In the embodiment illustrated, the heating device comprises at least one inductor 5 disposed in the working area 4 for heating the workpiece 3 by induction. The inductor 5 comprises at least two inductor parts 6, 7 which can be moved relative to one another into a working position enclosing a workpiece to be welded 3 and an open position in which the inductor parts 6, 7 are spaced apart from one another, releasing the workpiece 3. FIG. 1 illustrates an open position whilst FIGS. 4 and 5 illustrate the working position of the inductor 5. The coils 9, 10 of the inductor parts 6, 7 carrying current and disposed around the working area 4 are indicated schematically and could be provided in any layout.

The inductor parts 6, 7 can be moved relative to one another in the transverse direction, preferably perpendicular to the axis 19 of the inductor 5 (FIG. 4). At least one of the inductor parts 6 can be connected to a drive 8 so that it can be driven relative to the other inductor part 7. The inductor parts may enclose the workpiece from above and underneath but also in the lateral direction (FIG. 5).

The welding device 1 illustrated in FIG. 1 also comprises a control unit 12 which is connected to the drive 8 and automatically controls the latter.

In the embodiment illustrated, the welding device 1 has at least two housing parts 14, 15 which can be moved relative to one another so as to form a chamber 21 (FIG. 4) around the working area 4 when in a working position. Accordingly, one of the inductor parts 6 is integrated in one of the housing parts 14 and another inductor part 7 is integrated in another housing part 15. The inductor parts 6, 7 preferably sit against the internal wall of the housing parts 14, 15 in each case.

Figure 2:
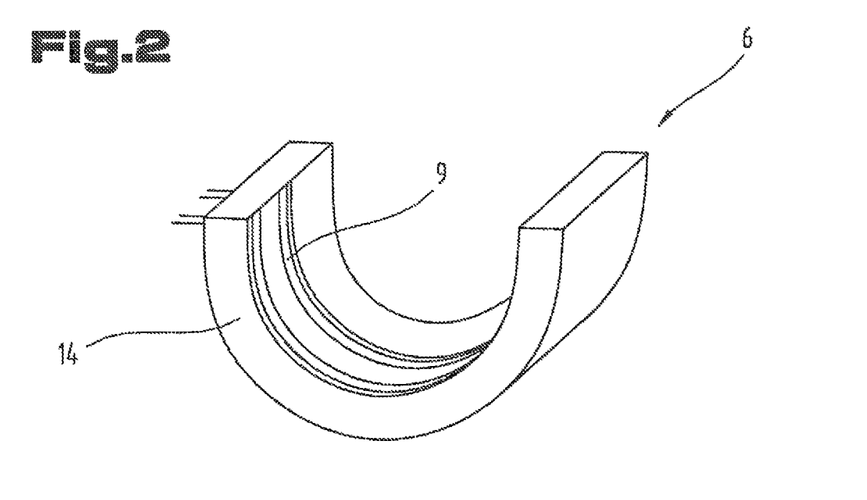
FIG. 2 a housing part with integrated inductor part.

As may be seen from FIG. 2, the housing parts have the shape of half-shells and can therefore form a more or less closed chamber 21 around the working area 4.

Figure 3:
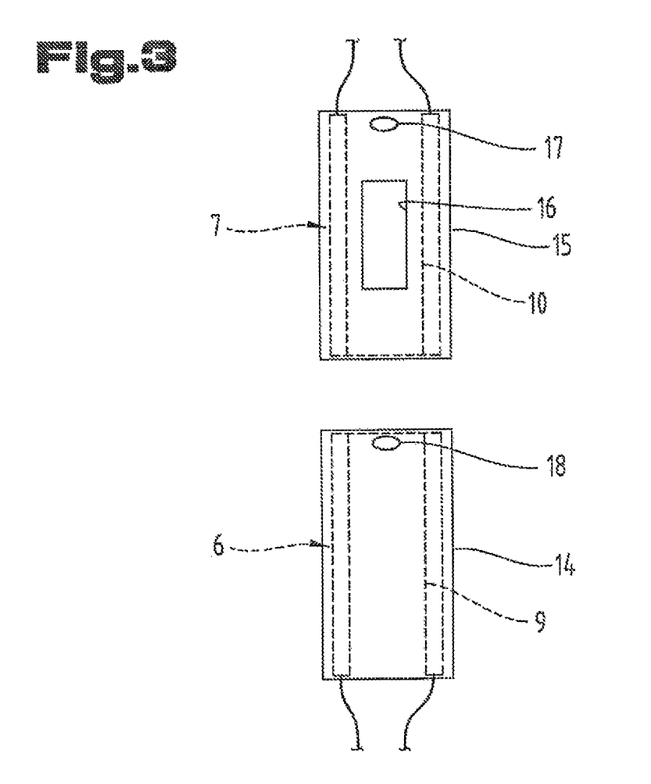
FIG. 3 the external face of two co-operating housing parts.

As may be seen from FIG. 3 in which the housing parts are illustrated from outside (top and bottom), one of the housing parts 14 has an inlet 17 for feeding in a purging medium (e.g. inert gas). The other housing part 15 has an outlet 18 for discharging a purging medium. One of the housing parts 15 has a working opening 16 through which thermal energy from the welding head 2, in particular in the form of a laser beam, disposed outside the chamber 21 can be directed onto the workpiece 3 (see also FIG. 4).

Disposed in the working area 4 is a temperature sensor 13 which is preferably coupled with an inductor part 7 and sits inside housing part 15.

The windings of the inductor 5 are preferably disposed symmetrically with respect to the working area (4) in terms of number, e.g. one winding each to the left and right of the welding point (FIG. 4).

FIG. 5 illustrates a particularly preferred embodiment in which the housing or housing-type structure is surrounded by a thermal insulation 20. Alternatively, the housing 14, 15 itself could be made from thermally insulating material. Also illustrated is the way in which the welding beam is introduced between the housing parts 14, 15 into the chamber 21.

The control unit 12 is also connected to a power supply 11 of the inductor 5, the welding head 2 and optionally the temperature sensor 13 in order to run an automated process sequence.

Figure 7:
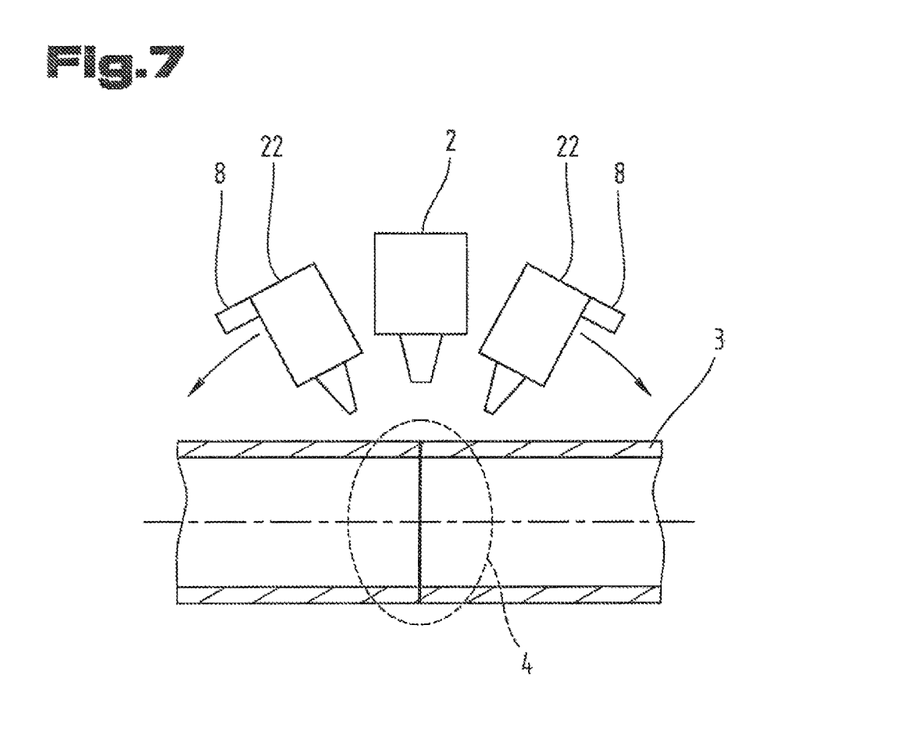
FIG. 7 an embodiment with a heating device emitting radiation.

As in the case of the embodiment illustrated as an example in FIG. 7, the heating device 22 may also be a radiation source, in particular a laser source, which can preferably be rotated around the working area 4 by means of a drive 8, e.g. about the longitudinal axis of the workpiece 3. The diagram of the drive S is purely schematic and is merely intended as an illustration. It may be a rotary or linear drive which is electrically, magnetically, pneumatically or hydraulically driven, for example.

Alternatively, the heating device could also comprise beam deflecting means which deflect beams emitted by the welding head 2 and direct them onto the working area 4. It would also be conceivable for the heating device to comprise at least one electric heating element.

It is particularly preferable if the at least one heating device is configured so that it acts on the workpiece 3 on either side of the welding point, as illustrated in FIG. 4. Another option would be to provide a first heating device 5, 22 acting on one side of the welding point and a second heating device 5, 22 acting on the other side of the welding point (FIG. 7).

Figure 8:
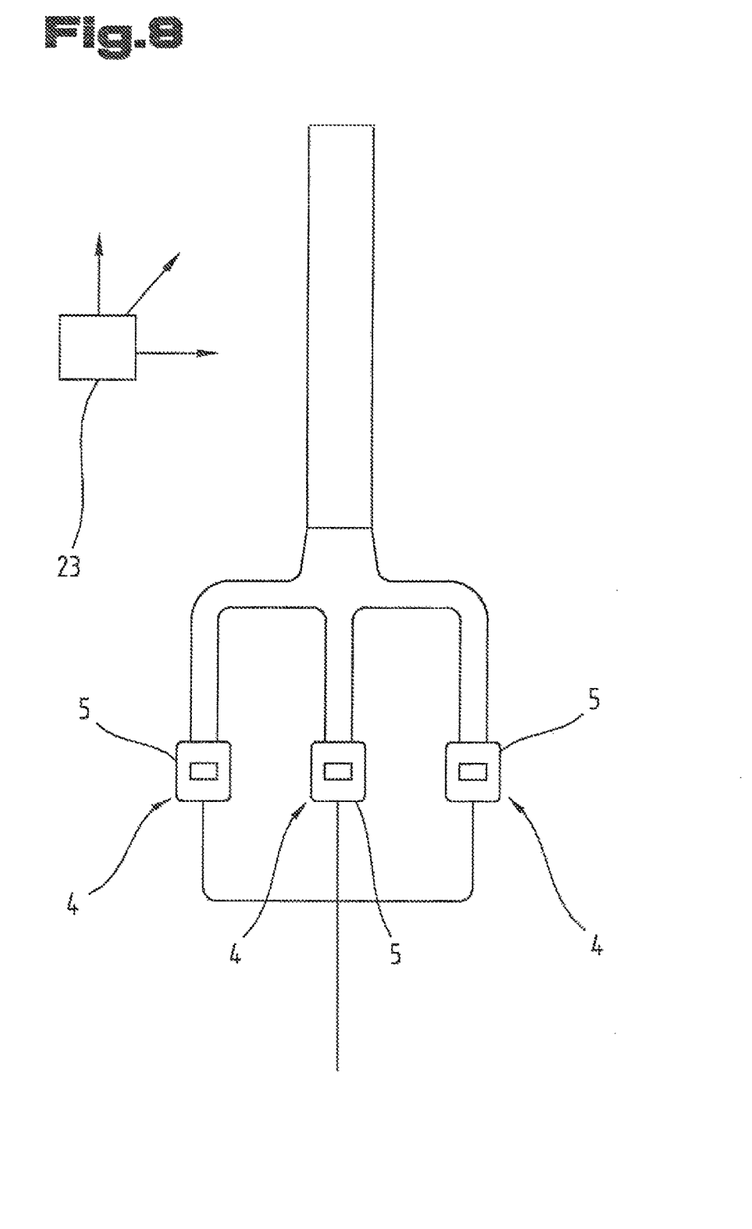
FIG. 8 an embodiment with parallel welding stations or welding lines.

As may be seen from the embodiment illustrated in FIG. 8, the welding device 1 comprises at least two (in this instance, three) welding stations or welding lines disposed next to one another, which can be set up by means of at least one workpiece carrier 23 with a workpiece 3 to be welded or workpiece parts. The heating device or heating devices are configured so that workpieces 3 or workpiece parts can be heated by the heating device on the basis of a timed cycle and it is preferable if each welding station or each welding line has a separate heating device.

The preferred welding method will be described in more detail below. It is a welding method, in particular a laser welding method, for welding workpieces 3 using one of the welding devices described above. The method comprises the steps: positioning a workpiece to be welded 3 in the working area 4 of the welding head; running the welding operation by activating the welding head 2; and heating the workpiece 3 by means of the heating device 5, 22 before, during and/or after the welding operation.

It is preferably a welding method, in particular a laser welding method, for welding metal workpieces 3 characterized by the steps: positioning a workpiece to be welded 3 in the working area 4 of the welding head 2 whilst the inductor 5 is in an open position in which the inductor parts 6, 7 are spaced apart from one another; moving the inductor parts 6, 7 relative to one another into the working position in order to enclose the workpiece to be welded 3; running the welding operation by activating the welding head 2; and heating the workpiece 3 by energizing the inductor 5.

It is preferable if the workpiece 3 is heated by the heating device 5, 22 before the welding operation, in which case the duration of the heating operation before the welding operation is at least 0.01 s (seconds), preferably at least 0.5 s, more particularly preferably at least 1 s. Particularly short preheating times can be achieved using a laser source as the heating device.

The workpiece 3 is preferably heated by the heating device 5, 22 during the welding operation.

The workpiece 3 is preferably heated by the heating device 5, 22 after the welding operation, in which case the duration of the heating operation after the welding operation is preferably at least 5 s, preferably at least 10 s.

At this stage, it should be pointed out that the times specified above are purely examples and are based on a specific configuration (in particular using induction). The actual pre-heating and reheating times will depend on the nature of the material, the shape of the material and in particular the material thickness.

Figure 6:
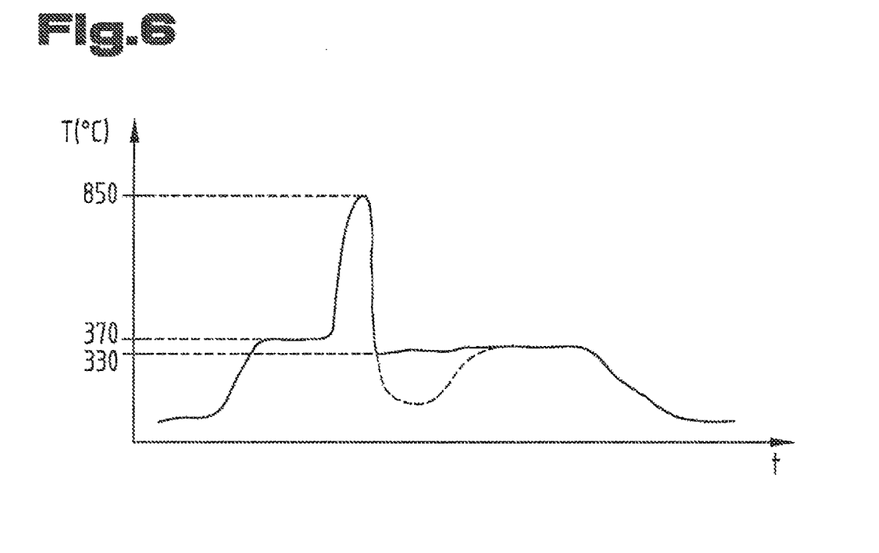
FIG. 6 a graph plotting the temperature in the immediate region of the weld seam.

A preferred work process will be described in more detail with reference to FIG. 6. In a first step, the temperature of the workpiece 3 is brought to a value of between 300° C. and 450° C., preferably to a value of between 320° C. and 400° C. (in this instance: 370° C.) by means of the heating device, e.g. the inductor 5. In another step, the actual welding operation is run by activating the welding head 2. Depending on the material, high temperatures are reached (e.g. between 800° C. and 900° C., in this instance 850° C., and significantly higher temperatures are possible). In a next step immediately after the welding operation, the workpiece 3 is kept at a value of between 250° C. and 400° C., preferably a value of between 300° C. and 380° C. (in this instance: 330° C.) by the heating device. Due to the heating device proposed by the invention, the temperature is prevented from falling sharply after the welding operation before a heat treatment step, which is undesirable (curve on broken lines in FIG. 6).

In a preferred embodiment, a temperature measurement is taken before, during and/or after the welding operation by means of a temperature sensor 13 disposed in the working area 4 (FIG. 1) and heating of the workpiece 3 by the heating device is controlled by a control unit 12 as a function of the temperature measurement.

Figure 9:
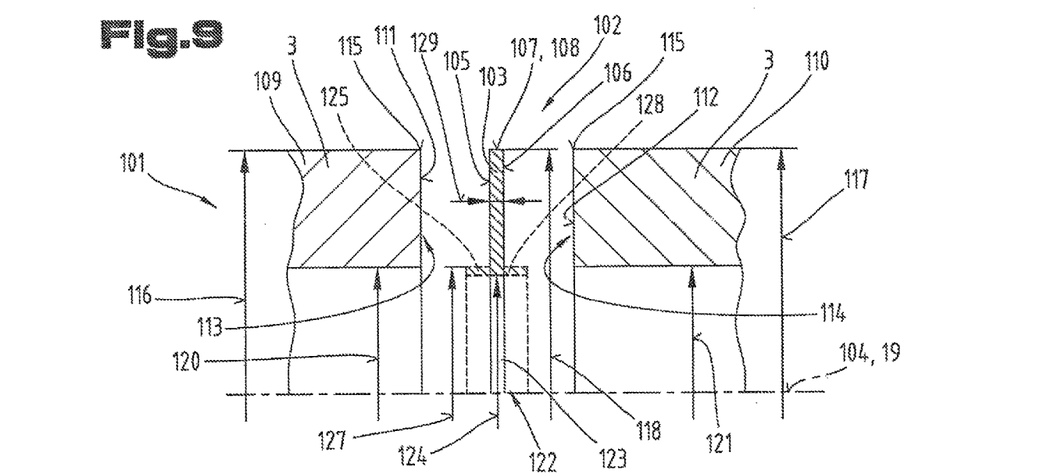
FIG. 9 a diagram in section of an example of an embodiment of a welding assembly in an exploded view.

FIG. 9 is a view in section illustrating a welding component 101, the individual parts of it being shown in half-section in an exploded diagram. In particular, a filler metal 102 for producing the weld joint is provided in the form of a filler metal body 103 and thus has a defined, exact and reproducible shape.

In the embodiment illustrated in FIG. 9, the filler metal body 103 is a rotationally symmetrical component having a mid-axis 104. The section in this diagram is shown along this mid-axis 104. For the sake of simplicity, the view illustrated in FIG. 9 represents only a quarter of the rotationally symmetrical body and the mid-axis 104 represents the boundary of the diagram.

As may be seen from FIG. 9, the filler metal body 103 has a first contact surface 105 and a second contact surface 106. The two contact surfaces 105, 106 on its external face are delimited by an outer lateral surface 107. In the embodiment illustrated as an example in which the filler metal body 103 is a rotationally symmetrical body, the outer lateral surface 107 is in the form of a cylindrical surface 108.

Also illustrated in the diagram in section of FIG. 9 are a first component 109 and a second component 110 which are to be joined using the filler metal 102 in a welding operation. The two components 109, 110 are also referred to as workpieces 3 in this document. The first component 109 has a first joint surface 111 which is placed in contact with the first contact surface 105 of the filler metal body 103 during the joining operation. The second component 110 has a second joint surface 112 which is placed in contact with the second contact surface 106 of the filler metal body 103 during the joining operation.

The two components 109, 110 are preferably made from a metal material and preferably have the same alloy composition or material composition. In individual cases, it may also be that the two components 109, 110 have a different alloy composition.

In the embodiment illustrated as an example in FIG. 9, the cross-section 113 of the first joint surface 11 and the cross-section 114 of the second joint surface 112 are of the same size. Due to the fact that in this example of an embodiment of the first component 109 and second component 110 are rotationally symmetrical with respect to the mid-axis 104, the cross-sections 113, 114 of the two joint surfaces 111, 112 have the shape of a circle.

As may also be seen from FIG. 9, the outer lateral surface 107 of the filler metal body 103 is adapted to an external contour 115 of the two joint surfaces 111, 112. In this respect, an external diameter 116 of the first component 109 and an external diameter 117 of the second component 110 may be of the same size. Furthermore, an external diameter 118 of the filler metal body 103 may also be of the same size as the two external diameters 116, 117 of the two components 109, 110. As a result on completion of the welding operation, a clean and uniform weld seam 119 is obtained which as far as possible does not protrude radially from the external diameters 116, 117 of the first and second component 109, 110, or does so only very slightly. In other embodiments, it may also be of practical advantage if the external diameter 118 of the filler metal body 103 is selected so as to be smaller or larger than the comparable external diameter 116, 117 of the first and second component 109, 110. The advantage of this is that a material shrinkage or potential material expansion during the welding operation can be compensated. As a result, the weld seam 119 will always have a clean and uniform shape if working with different possible combinations of different materials of the components 109, 110 and filler metal 102.

As may also be seen from FIG. 9, the components 109, 110 may be provided in the form of rotationally symmetrical hollow bodies, for example tubes. In this case, the components 109, 110 have an internal diameter 120, 121. Such tubes might be housings for conveying fluids or parts of some other type, for example.

To make it possible for such fluids to pass through the filler metal body 103, an orifice 123 may be provided in a central portion 122 of the filler metal body 103 which is adapted in terms of its internal diameter 124 to more or less the internal diameter 120, 121 of the first and second component 109, 110.

As may also be seen from FIG. 9 a first positioning projection 125 is provided on the filler metal body 103 which projects in a normal direction 126 relative to the first contact surface 105. This first positioning projection 125 may be used to position the filler metal body 103 exactly on the first component 109 during the joining operation. To this end, an external diameter 127 of the first positioning projection 125 is of more or less the same size as the internal diameter 120 of the first component 109. In this respect, it is preferable to opt for a transition fit so that the filler metal body 103 can be exactly positioned and is optionally also accommodated in the first component 109 to prevent it from slipping.

Similarly to the first positioning projection 125 just described, a second positioning projection 128 may also be provided which protrudes from the second joint surface 112 and can thus be used to position the second component 110.

It is also possible for the first positioning projection 125 and the second positioning projection 128 to be provided with a conical external surface, thereby improving the ability to obtain an exact position relative to the first component 109 and second component 110.

A thickness 129 of the filler metal body 103 is defined by the normal distance of the two contact surfaces 105, 106 from one another. The thickness 129 of the filler metal body 103 is crucial to the parameters of the weld seam 119 and is preferably approximately between 0.5 and 5 mm.

Figure 10:
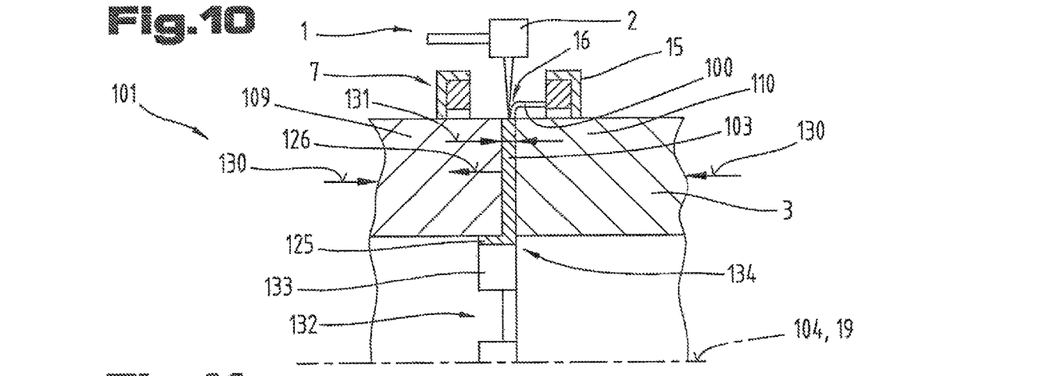
FIG. 10 a diagram in section of another example of an embodiment of a joined welding assembly.

FIG. 10 illustrates another example of an embodiment of the welding assembly 101, in particular the two components 109, 110 and the filler metal body 103 such as illustrated in the diagram in section of FIG. 9.

The diagram illustrated in FIG. 10 additionally shows how the second inductor part 7 and second housing part 15 may be disposed in the region of the two components 109, 110. The first inductor part 6 and the first housing part 14 are not illustrated in FIG. 10 with a view to retaining clarity but it will be clear to the skilled person that the layout of the inductor parts 6, 7 and housing parts 14, 15 overall is as illustrated in FIG. 4. It should also be noted that when joining the individual components to one another, the first component 109 is made ready, for example retained by a retaining device. The filler metal body 103 can be placed on the first component 109 by means of a retaining device 100 and positioned relative to the first component 109. Such a retaining device 100 might be integrated in the first or second inductor part 6, 7 or in the first or second housing part 14, 15 for example or may be fitted therein. Naturally, the retaining device 100 must be designed so that it does not hamper the welding operation. In this respect, it should be explicitly pointed out that the retaining device 100 is only schematically indicated in the diagram illustrated in FIG. 10 and FIG. 11 and may naturally be disposed at a different point and be of a different design. In another embodiment, it is also possible for the retaining device 100 to be disposed on another point of the welding device 1.

In the view illustrated in FIG. 10, the two components 109, 110 are joined to the filler metal body 103 and lie next to it. This state or positioning of the welding assembly 101 constitutes the basis for the start of the welding operation.

In order to facilitate positioning of the filler metal body 103 relative to the first component 109, the first positioning projection 125 may be disposed on the filler metal body 103 which co-operates with the first component 109. The second component 110 is then positioned relative to the first component 109 and relative to the filler metal body 103, being placed against the filler metal body 103.

Furthermore, a compression force 130 may be applied to both the first component 109 and the second component 110, in which case the two compression forces 130 are directed towards one another so that the two components 109, 110 are pressed together. Accordingly, the two components 109, 110 can be pressed against the filler metal body 103 lying between them, in particular against its contact surfaces 105, 106. As may be seen from FIG. 10, a normal distance 131 is created by the filler metal body 103 by which the first joint surface 111 of the first component 109 and the second joint surface 112 of the second component 110 are spaced apart from one another. Due to the geometry of the filler metal body 103, the normal distance 131 is the same size as the thickness 129 of the filler metal body 103.

By contrast with the diagram of FIG. 9, FIG. 10 illustrates a filler metal body 103 which has only a first positioning projection 125. In this case, it may be that the first positioning projection 125 is not provided in the form of an annular surface as in FIG. 9 but rather has one or more recesses 132 forming one or more claws 133. This results in a shape akin to a claw coupling, as illustrated in FIG. 10.

If the first component 109 and the second component 110 are hollow sections and pressed with their end faces against one another as illustrated FIG. 10, they will form a butt joint 134 at which the weld seam 119 will be formed, as may clearly be seen in FIG. 10.

Figure 11:
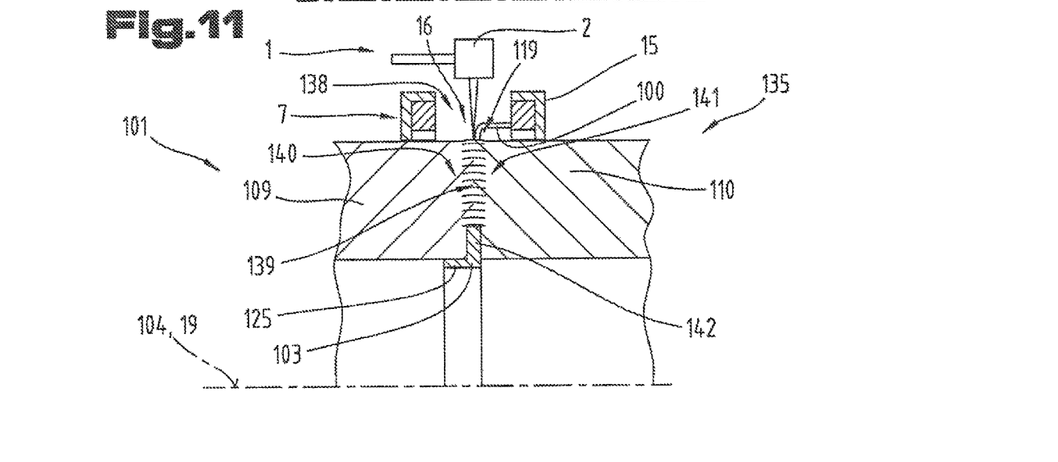
FIG. 11 a diagram in section of another example of an embodiment of a welding assembly joined to obtain a component unit.

FIG. 11 illustrates another example of an embodiment of the welding assembly 101, in particular the two components 109, 110 and the filler metal body 103 illustrated in the diagram in section of FIG. 9. The two components 109, 110 and the filler metal body 103 are illustrated in a welded state in FIG. 11 and thus form a component unit 135. In the embodiment of the filler metal body 103 illustrated as an example in FIG. 11, a first positioning projection 125 is provided in the form of a circumferentially extending ring.

As may be seen from FIG. 11, a welding device 1 comprising a welding head 2 may be provided for welding the welding components 101. An energy beam 138 may be emitted by the welding head 2, which transmits to the two components 109, 110 and filler metal body 103 the amount of heat needed to weld them. The energy beam 138 may be based on different media depending on the selected welding method.

Possible welding methods for which use of the filler metal body proposed by the invention has proved particularly effective are, for example, laser welding, electron beam welding, plasma welding and in particular plasma plug welding, defocused electron beam welding, and such like.

During the welding operation, either the welding head 2 is moved relative to the component unit 135 and the latter remains stationary or the welding head 2 is stationary and the component unit 135 is moved. For example, the component unit 135 can be rotated about the mid-axis 104 during the welding operation. Alternatively, both the welding head 2 and the component unit 135 are moved during the welding operation. This may be necessary if working with a component unit 135 with a lamellar filler metal body 103, as will be illustrated and described with reference to FIG. 15.

As may also be seen from FIG. 11, the energy introduced by means of the welding head 2 is metered or selected in such a way that only an outer peripheral region 139 of the filler metal body 103 and an adjoining part-region 140 of the first component 109 and a second part-region 141 of the second component 110 are melted. As a result, an inner region 142 of the filler metal body 103 is not melted and thus remains dimensionally stable, as a result of which an at least approximately constant normal distance 131 can be maintained during the welding operation. This normal distance 131 remains unaltered even if the compression force 130 is varied. However, the normal distance 131 can be varied slightly due to expansion in the filler metal body 103 and in the components 109, 110 caused by changes in temperature.

Alternatively, the filler metal body 103 could also be completely melted during the welding operation, thereby forming a homogenous connection to the two components 109, 110.

In yet another embodiment, the welding head 2 ensures that the requisite energy is introduced into the interior of the components 109, 110 to enable the weld seam 119 to be produced from two sides or to enable energy to be transmitted to the internal face only. Furthermore, for reasons relating to space, the welding head 2 is positioned away from the two components 109, 110 and the energy beam, for example a laser beam, is deflected by mirror elements.

Figure 12:
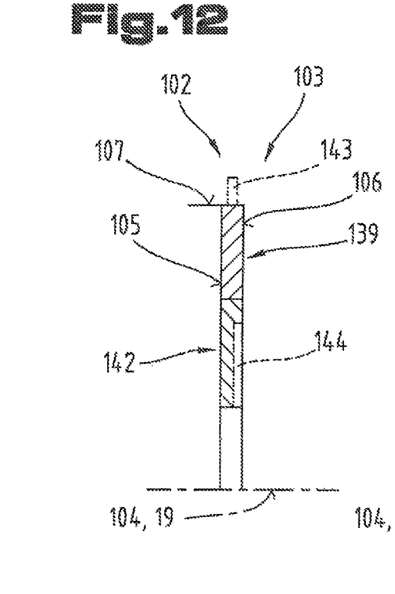
FIG. 12 a diagram in section of another example of an embodiment of a filler metal body.

FIG. 12 illustrates another example of an embodiment of a filler metal body 103 based on the diagram in section illustrated in FIG. 1. In the case of this example of an embodiment, the filler metal body 103 may comprise a first material composition in the outer peripheral region 139 and a second material composition in the inner region 142. The advantage of this is that a distribution of alloying elements can be used in the first material composition of the outer peripheral region 139 that is different from the distribution of alloying elements in the second material composition of the inner region 142, for example. Furthermore, the two material compositions may have different melting temperatures, as a result of which the same temperature can be obtained by introducing a large amount of heat but only the outer peripheral region 139 is melted, for example.

In addition and irrespective of the material composition, a retaining pin 143 may be provided on the outer lateral surface 107 of the filler metal body 103, as schematically indicated in FIG. 12. This retaining pin 143 may be used as a means of manipulating and holding the filler metal body 103.

Irrespective of the above, one or more cooling passages 144 may be provided in the filler metal body 103 which distribute heat and direct heat in the filler metal body 103. These cooling passages 144 may be provided either in the region of the two contact surfaces 105, 106, in particular in the outer peripheral region 139, or another option is to provide the cooling passages 144 in the inner region 142.

Figure 13:
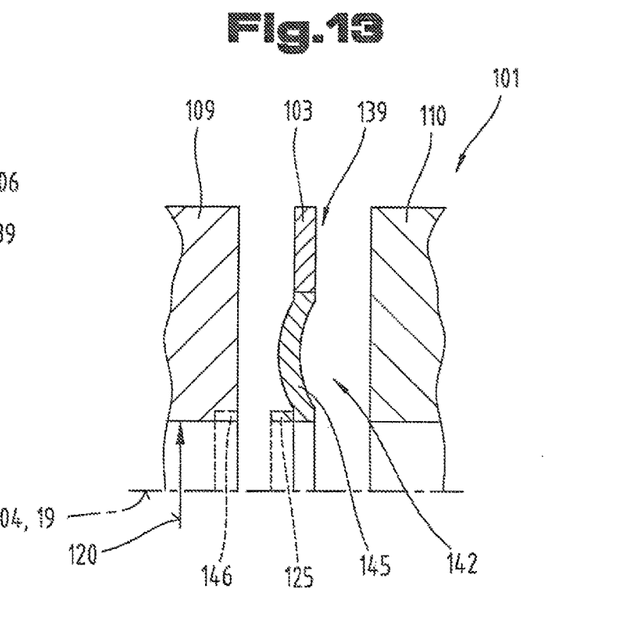
FIG. 13 a diagram in section of another example of an embodiment of a welding assembly with a lamellar spring element in the filler metal body.

FIG. 13 illustrates another example of an embodiment of a welding assembly 101 based on the diagram in section illustrated in FIG. 9. In the case of this example of an embodiment, an elastic spring element 145 is provided in the filler metal body 103. The spring element 145 may be disposed in the inner region 142 for example, and as may be seen from FIG. 13, it may be provided in the form of a bulge or have a strip-type shape or corrugated shape obtained by material deformation or forming. As a result of this, a certain amount of pre-tensioning force can be applied when joining the two components 109, 110. During a welding operation, only the outer peripheral region 139 is welded to the two components 109, 110 and the inner region 142 provided as a spring element 145 is not melted. This means that the pre-tensioning between the two components 109, 110 applied by the spring element 145 can also be preserved or stored, for example, on completion of the welding operation.

As may also be seen from FIG. 13, a recess 146 is provided on at least the first component 109 in which the positioning projection 125 of the filler metal body 103 can be inserted. As a result, the filler metal body 103 will not protrude inwards beyond the internal diameter 120 of the first component 109 and the entire interior is available for conveying a fluid after welding.

Figure 14:
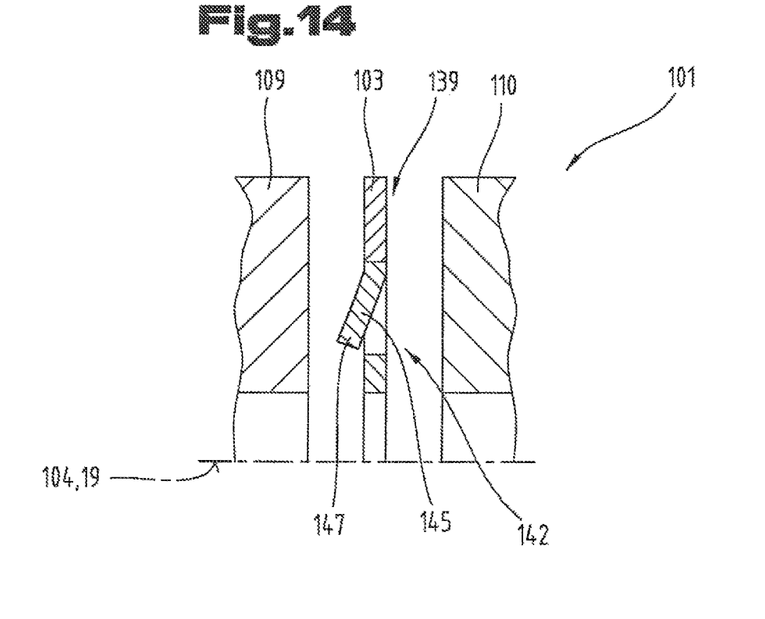
FIG. 14 a diagram in section of another example of an embodiment of a welding assembly with a punched spring element in the filler metal body.

FIG. 14 illustrates another example of an embodiment of a welding assembly 101 based on the diagram in section illustrated in FIG. 9, and in this example of an embodiment the spring element 145 was produced by a mechanical process such as punching. This enables several tabs 147 to be obtained by means of which a pre-tensioning force can be applied.

Figure 15:
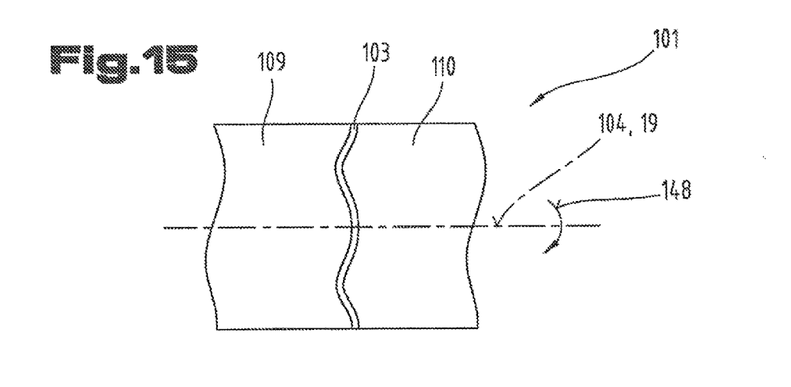
FIG. 15 a front view of another example of an embodiment of a welding assembly with a lamellar filler metal body.

FIG. 15 is a view illustrating another example of an embodiment of a welding assembly 101 based on the diagram in section illustrated in FIG. 1, and in this example of an embodiment the filler metal body 103 and the joint surfaces 111, 112 of the two components 109, 110 are lamellar and are joined to one another as illustrated in FIG. 15. In this instance, the components 109, 110 may have the external shape of a shaft or hollow shaft, for example a tube. The lamellar shape may be of particular advantage if joining two components 109, 110 that are designed and intended to transmit torsional moment.

Figure 16:
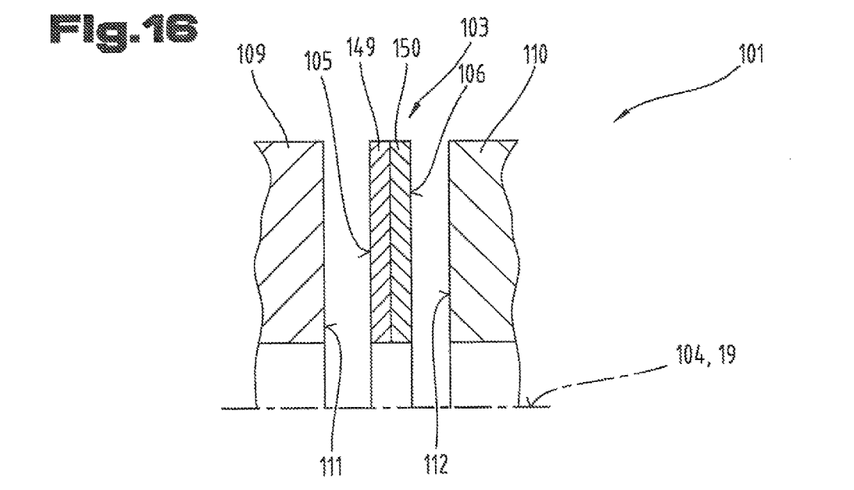
FIG. 16 a diagram in section of another example of an embodiment of a welding assembly with a filler metal body with different material compositions.

FIG. 16 illustrates another example of an embodiment of a welding assembly 101 and in this case the filler metal body 103 may have a first contact surface portion 149 in the region of the first contact surface 105 which is made from a first material composition and a second contact surface portion 150 in the region of the second contact surface 106 which is made from a second material composition. This can be of advantage if, for example, a first component 109 and a second component 110 have to be welded to one another and they have a different material composition or different alloy components. In this case, the first contact surface portion 149 can be joined to the first component 109 of a first alloy particularly effectively in the molten state and the second contact surface portion 150 can be joined particularly effectively to a second component 110 made from a second alloy.

Figure 17:
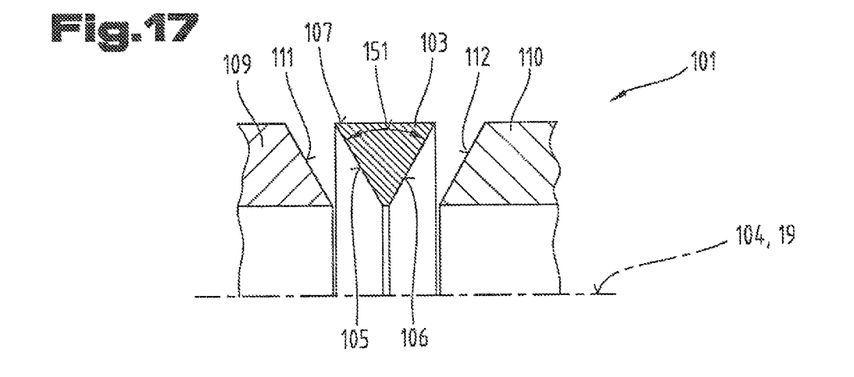
FIG. 17 a diagram in section of another example of an embodiment of a welding assembly with a filler metal body with angled contact surfaces.

FIG. 17 illustrates another example of an embodiment of a welding assembly 101. As may be seen from FIG. 17, the filler metal body 103 does not have two contact surfaces 105, 106 oriented parallel with one another and instead they are disposed at an angle 151 to one another.

As a result, a type of V-shaped seam can be obtained and a wider weld seam 119 can be produced on the outside by introducing more heat, such as at the root or internal face.

| List of reference numbers | |
| --- | --- |
| 1 | Welding device |
| 2 | Welding head |
| 3 | Workpiece |
| 4 | Working area |
| 5 | Inductor |
| 6 | First inductor part |
| 7 | Second inductor part |
| 8 | Drive |
| 9 | Coil |
| 10 | Coil |
| 11 | Power supply |
| 12 | Control unit |
| 13 | Temperature sensor |
| 14 | First housing part |
| 15 | Second housing part |
| 16 | Working opening |
| 17 | Inlet |
| 18 | Outlet |
| 19 | Axis of inductor 5 |
| 20 | Insulation |

-continued

| | List of reference numbers |
|---|---|
| 21 | Chamber |
| 22 | Radiation source |
| 23 | Workpiece carrier |
| 100 | Retaining device |
| 101 | Welding assembly |
| 102 | Filler metal |
| 103 | Filler metal body |
| 104 | Mid-axis |
| 105 | First contact surface |
| 106 | Second contact surface |
| 107 | Outer lateral surface |
| 108 | Cylindrical surface |
| 109 | First component |
| 110 | Second component |
| 111 | First joint surface |
| 112 | Second joint surface |
| 113 | Cross-section of first joint surface |
| 114 | Cross-section of second joint surface |
| 115 | External contour of a joint surface |
| 116 | External diameter of first component |
| 117 | External diameter of second component |
| 118 | External diameter of filler metal body |
| 119 | Weld seam |
| 120 | Internal diameter of first component |
| 121 | Internal diameter of second component |
| 122 | Central portion |
| 123 | Orifice |
| 124 | Internal diameter of orifice |
| 125 | First positioning projection |
| 126 | Normal direction |
| 127 | External diameter of first positioning projection |
| 128 | Second positioning projection |
| 129 | Thickness of filler metal body |
| 130 | Compression force |
| 131 | Normal distance |
| 132 | Recess |
| 133 | Claws |
| 134 | Butt joint |
| 135 | Component unit |
| 136 | |
| 137 | |
| 138 | Energy beam |
| 139 | Outer peripheral region |
| 140 | First part-region of first component |
| 141 | Second part-region of second component |
| 142 | Inner region |
| 143 | Retaining pin |
| 144 | Cooling passage |
| 145 | Spring element |
| 146 | Recess |
| 147 | Tabs |
| 148 | Torsional moment |
| 149 | First contact surface portion |
| 150 | Second contact surface portion |
| 151 | Angled contact surfaces |

The invention claimed is:

1. Welding device (1), in particular a laser welding device, for welding workpieces (3), comprising at least one welding head (2), in particular a laser welding head, which is directed onto a working area (4) when in the working position, and at least one heating device (5) acting on the working area (4) in order to heat up the workpiece (3), in particular before and/or after the welding operation, wherein the welding device (1) comprises at least two adjacently disposed welding stations or welding lines which can be set up with workpieces (3) or workpiece parts to be welded by means of at least one workpiece carrier (23) and the at least one heating device (5, 22) is configured so that the workpieces (3) or workpiece parts can be heated by the heating device (5, 22) in timed cycles.

2. Welding device according to claim 1, wherein the heating device (5, 22) or at least a part (6, 7) of the heating device (5, 22) can be moved relative to the working area (4), and the heating device (5, 22) or at least a part (6, 7) of the heating device (5, 22) is preferably connected to a drive (8) and can be driven by it.

3. Welding device according to claim 1, wherein the heating device comprises at least one inductor (5) disposed in the working area (4) for heating the workpiece (3) by induction.

4. Welding device according to claim 3, wherein the inductor (5) comprises at least two inductor parts (6, 7) which can be moved relative to one another into a working position in order to enclose a workpiece to be welded (3) and into an open position in which the inductor parts (6, 7) are spaced apart from one another to release the workpiece (3).

5. Welding device according to claim 4, wherein the inductor parts (6, 7) can be moved relative to one another in the direction extending transversely to, preferably perpendicular to, the axis (19) of the inductor (5).

6. Welding device according to claim 3, wherein at least one of the inductor parts (6, 7) is connected to a drive (8) and can be driven by it relative to the other inductor part (7, 6).

7. Welding device according to claim 2, wherein the welding device (1) comprises a control unit (12) which is connected to the drive (8) and automatically controls it.

8. Welding device according to claim 3, wherein the welding device (1) comprises at least two housing parts (14, 15) which can be moved relative to one another in order to form a chamber (21) around the working area (4) when in a working position and one of the inductor parts (6) is integrated in one of the housing parts (14) and another inductor part (7) is integrated in another housing part (15).

9. Welding device according to claim 8, wherein the inductor parts (6, 7) respectively sit against the internal wall of the housing parts (14, 15).

10. Welding device according to claim 8, wherein at least one of the housing parts (14) has an inlet (17) for feeding in a purging medium.

11. Welding device according to claim 8, wherein at least one of the housing parts (15) has an outlet (18) for discharging a purging medium.

12. Welding device according to claim 8, wherein at least one of the housing parts (14, 15) has a working opening (16) via which the thermal energy from the welding head (2) disposed outside the chamber, in particular in the form of a laser beam, can be directed onto the workpiece (3).

13. Welding device as claimed in claim 1, wherein a temperature sensor (13) is disposed in the working area (4) which is preferably coupled with one of the inductor parts (6, 7).

14. Welding device according to claim 3, wherein windings of the inductor (5) are disposed symmetrically by reference to the working area (4) in terms of number.

15. Welding device according to claim 3, wherein the welding device (1) comprises a control unit (12) which is connected to a power supply (11) of the inductor (5), the welding head (2) and optionally the temperature sensor (13).

16. Welding device as claimed in claim 1, wherein the heating device (22) is a radiation source, in particular a laser source, and the radiation source is preferably rotatable around the working area (4) by means of a drive (8).

17. Welding device as claimed in claim 1, wherein the heating device comprises beam deflecting means which deflect the beams emitted by the welding head (2) and direct them onto the working area (4).

18. Welding device as claimed in claim 1, wherein the heating device comprises at least one electric heating element.

19. Welding device as claimed in claim 1, wherein the at least one heating device is configured so that it acts on the workpiece (3) on both sides of the welding point.

20. Welding device as claimed in claim 1, wherein a first heating device (5, 22) acts on one side of the welding point and a second heating device (5, 22) acts on the other side of the welding point.

21. Welding device as claimed in claim 1, wherein each welding station or each welding line preferably comprises a separate heating device (5, 22).

22. Welding device as claimed in claim 1, wherein the welding device (1) comprises a retaining device (100) by means of which a filler metal (102) can be introduced between the first joint surface (111) of a first component (109) and a second joint surface (112) of a second component (110), and the filler metal (102) is provided in the form of a shaped filler metal body (103) having a first contact surface (105) which can be placed in contact with the first joint surface (111) of the first component (109) and a second contact surface (106) which can be placed in contact with the second joint surface (112) of the second component (110).

23. Welding method, in particular a laser welding method, for welding workpieces (3) by means of a welding device as claimed in claim 1, further comprising the steps:
positioning a workpiece to be welded (3) in the working area (4) of the welding head; running the welding operation by activating the welding head (2); and heating the workpiece (3) by means of the heating device (5) before, during and/or after the welding operation.

24. Welding method, in particular a laser welding method, for welding metal workpieces (3) by means of a welding device according to claim 4, further comprising the steps:
positioning a workpiece to bee welded (3) in the working area (4) of the welding head (2) whilst the inductor (5) is in an open position in which the inductor parts (6, 7) relatively into the working position in order to enclose the workpiece to be welded (3); running the welding operation by activating the welding head (2); and heating the workpiece (3) by energizing the inductor (5).

25. Welding method according to claim 23, wherein the workpiece (3) is heated by means of the heating device (5, 22) before the welding operation.

26. Welding method according to claim 25, wherein during pre-heating by means of the heating device (5, 22), the workpiece (3) is brought to a temperature of between 300° C. and 450° C., preferably between 320° C. and 400° C., in the region of the future weld seam.

27. Welding method according to claim 23, wherein the workpiece (3) is heated by means of the heating device (5, 22) during the welding operation.

28. Welding method according to claim 23, wherein the workpiece (3) is heated by means of the heating device (5, 22) after the welding operation.

29. Welding method according to claim 28, wherein during reheating by means of the heating device (5, 22), the workpiece (3) is kept at a temperature of between 250° C. and 400° C., preferably between 300° C. and 380° C., in the region of the weld seam.

30. Welding method according to claim 23, wherein before, during and/or after the welding operation, a measurement is taken of the temperature by means of a temperature sensor (13) disposed in the working area (4) and heating of the workpiece (3) by means of the heating device (5, 22) is controlled by a control unit (12) depending on the temperature measurement.

31. Welding method according to claim 23, wherein the following method steps are additionally run as part of the welding method:
providing the first component (109);
providing a filler metal (102) in the form of a shaped filler metal body (103) having a first (105) and a second contact surface (106);
positioning the filler metal body (103) so that the first contact surface (105) of the filler metal body (103) is placed in contact with a first joint surface (111) of the first component (109);
positioning a second component (110) relative to the first component (109) so that a second joint surface (112) of a second component (110) is placed in contact with the second contact surface (106) of the filler metal body (103).

32. Welding method according to claim 31, wherein before and/or during the welding operation, a compression force (130) is applied to the two components (109, 110) from opposite directions, thereby pushing them together.

33. Welding method according to claim 31, wherein the thermal energy applied can be measured in such a way that during the welding operation, only an outer peripheral region (139) of the filler metal body (103) and the part-regions (140, 141) of the two components (109, 110) respectively adjoining the outer peripheral region (139) are melted.

34. Welding method according to claim 31, wherein the two joint services (111, 112) of the components (109, 110) have more or less the same cross-section (113, 114) as one another and are disposed next to one another forming a normal distance (131) which is bridged by the filler metal body (103) in the form of a butt joint (134).

* * * * *

UNITED STATES PATENT AND TRADEMARK OFFICE
CERTIFICATE OF CORRECTION

Page 1 of 1

PATENT NO. : 10,166,635 B2
APPLICATION NO. : 15/022237
DATED : January 1, 2019
INVENTOR(S) : Grausgruber et al.

It is certified that error appears in the above-identified patent and that said Letters Patent is hereby corrected as shown below:

In the Claims

In particular, in Column 19, Line 35, (Line 4 of Claim 24) please change "bee" to correctly read: --be--.

In Column 19, Line 37, (Line 6 of Claim 24) after "inductor parts (6, 7)" please add: --are spaced apart from one another; moving the inductor parts (6, 7)--.

Signed and Sealed this
Fifth Day of March, 2019

Andrei Iancu
*Director of the United States Patent and Trademark Office*